(12) United States Patent
Hah et al.

(10) Patent No.: US 7,667,032 B2
(45) Date of Patent: Feb. 23, 2010

(54) METHOD OF MANUFACTURING A MICROARRAY

(75) Inventors: Jung-hwan Hah, Hwaseongi-si (KR); Sung-min Chi, Hwaseongi-si (KR); Kyoung-seon Kim, Suwon-si (KR); Won-sun Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 358 days.

(21) Appl. No.: 11/748,175

(22) Filed: May 14, 2007

(65) Prior Publication Data
US 2008/0076128 A1   Mar. 27, 2008

(30) Foreign Application Priority Data
Jul. 17, 2006   (KR) .................... 10-2006-0066633

(51) Int. Cl.
C07H 21/00   (2006.01)
C07H 21/02   (2006.01)
C12Q 1/68    (2006.01)
(52) U.S. Cl. .................... 536/25.3; 536/23.1; 435/6
(58) Field of Classification Search ................ 536/23.1, 536/25.3; 435/6
See application file for complete search history.

(56) References Cited

U.S. PATENT DOCUMENTS

| | | | |
|---|---|---|---|
| 5,658,734 | A | 8/1997 | Brock et al. |
| 5,744,305 | A | 4/1998 | Fodor et al. |
| 6,426,184 | B1 * | 7/2002 | Gao et al. ................ 435/6 |
| 2005/0171334 | A1 | 8/2005 | Sellergreen et al. |
| 2006/0040314 | A1 | 2/2006 | Christians et al. |

FOREIGN PATENT DOCUMENTS

| KR | 20010001576 | 5/2001 |
|---|---|---|
| KR | 2001-0053471 | 6/2001 |

OTHER PUBLICATIONS

US Patent No. 6,359,125 (corresponding to KR2001-0053471).

* cited by examiner

*Primary Examiner*—Jezia Riley
(74) *Attorney, Agent, or Firm*—F. Chau & Associates, LLC

(57) ABSTRACT

A method of manufacturing a microarray includes providing a substrate having a surface that is immobilized with a functional group protected with an acid-labile protecting group and capable of coupling with an oligomer probe, providing a photoacid generator onto the substrate, disposing on the substrate an imprint template comprising a convex region and a plurality of concave regions surrounding the convex region so that the convex region contacts with or is adjacent to an upper surface of the substrate to define a plurality of reaction zones by the upper surface of the substrate and the convex region and the concave regions of the imprint template, exposing one or more of the reaction zones to light so that an acid is generated by the photoacid generator in the one or more exposed reaction zones and a functional group in the one or more exposed reaction zones is deprotected by the acid, and providing an oligomer probe onto the substrate so that the oligomer probe couples with the deprotected functional group.

20 Claims, 12 Drawing Sheets

METHOD OF MANUFACTURING A MICROARRAY

CROSS-REFERENCE TO RELATED PATENT APPLICATION

This application claims priority from Korean Patent Application No. 10-2006-0066633 filed on Jul. 17, 2006, the disclosure of which is hereby incorporated by reference herein in its entirely.

BACKGROUND OF THE INVENTION

1. Technical Field

The present disclosure relates to a method of manufacturing a microarray, and more particularly, to a method of manufacturing a microarray with an enhanced reaction yield.

2. Description of the Related Art

With the advancements made in genome projects, the genomic nucleotide sequences of various organisms have been disclosed. Thus, there has been an increasing interest in biopolymer microchips, and in particular, microarrays. Microarrays are tools that have been widely used in, for example, gene expression profiling, genotyping through detection of mutation or polymorphism such as Single-Nucleotide Polymorphism (SNP), a protein or peptide assay, potential drug screening, development and preparation of novel drugs, etc.

A widely available microarray may be manufactured by, for example, exposing to light predetermined regions of a substrate which contain functional groups protected with photo-labile protecting groups removing protecting groups, exposing functional groups in the predetermined regions, and then performing in situ polymerization of monomers in the predetermined regions.

However, to remove photo-labile protecting groups with light irradiation, exposure energy of 5,000 millijoules (mJ) or more may be required, which may result in a large amount of exposure and time, which thereby may lengthen the duration of the process. Furthermore, protecting groups removed during the removal of photo-labile protecting groups may interfere with the removal of other protecting groups. In addition, as microarrays become highly integrated, intervals between immobilized functional groups may decrease, thereby making it more difficult to remove photo-labile protecting groups and resulting in a reduction in reaction yield.

Thus, there is a need for a method for manufacturing a microarray which can reduce process duration and enhance reaction yield.

SUMMARY OF THE INVENTION

Exemplary embodiments of the present invention provide a method of manufacturing a microarray which can reduce process duration and enhance reaction yield.

In accordance with an exemplary embodiment of the present invention, a method of manufacturing a microarray is provided. The method includes providing a substrate having a surface that is immobilized with a functional group protected with an acid-labile protecting group and capable of coupling with an oligomer probe, providing a photoacid generator onto the substrate, disposing on the substrate an imprint template comprising a convex region and a plurality of concave regions surrounding the convex region so that the convex region contacts with or is adjacent to an upper surface of the substrate to define a plurality of reaction zones by the upper surface of the substrate and the convex region and the concave regions of the imprint template, exposing one or more of the reaction zones to light so that an acid is generated by the photoacid generator in the one or more exposed reaction zones and a functional group in the one or more exposed reaction zones is deprotected by the acid, and providing an oligomer probe onto the substrate so that the oligomer probe couples with the deprotected functional group.

In accordance with an exemplary embodiment of the present invention, a method of manufacturing a microarray is provided. The method includes providing a substrate having a surface that is immobilized with a functional group protected with an acid-labile protecting group and capable of coupling with a nucleotide phosphoramidite monomer; providing a photoacid generator onto the substrate; disposing on the substrate an imprint template comprising a convex region and a plurality of concave regions surrounding the convex region so that the convex region contacts with or is adjacent to an upper surface of the substrate to define a plurality of reaction zones by the upper surface of the substrate and the convex region and the concave regions of the imprint template; exposing one or more of the reaction zones to light so that an acid is generated by the photoacid generator in the one or more exposed reaction zones and a functional group in the one or more exposed reaction zones is deprotected by the acid; and providing a nucleotide phosphoramidite monomer onto the substrate so that the nucleotide phosphoramidite monomer couples with the deprotected functional group.

BRIEF DESCRIPTION OF THE DRAWINGS

Exemplary embodiments of the present invention can be understood in more detail from the following detailed description taken in conjunction with the attached drawings, in which.

DETAILED DESCRIPTION OF THE EXEMPLARY EMBODIMENTS OF THE INVENTION

Figure 1:
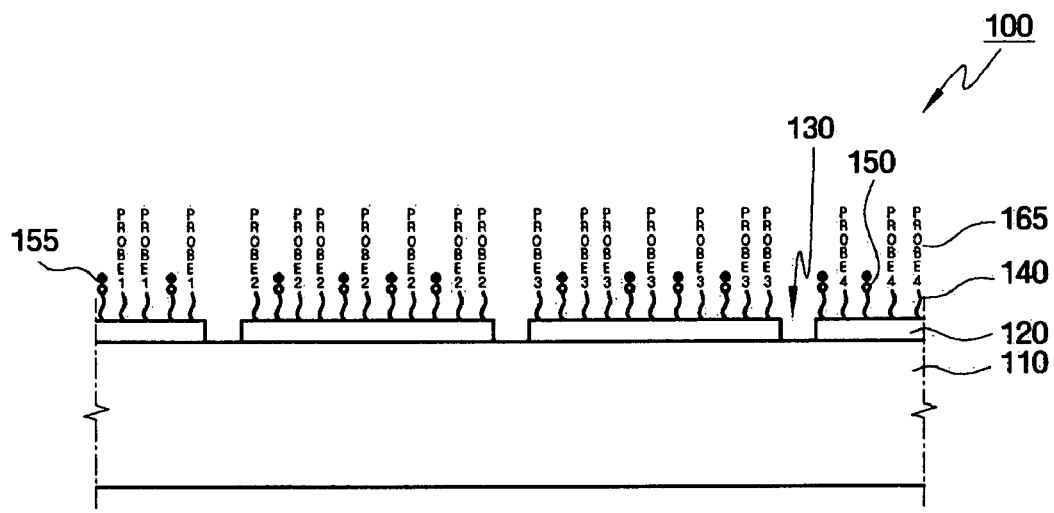
FIG. 1 is a sectional view illustrating a microarray manufactured using methods of manufacturing microarrays according to exemplary embodiments of the present invention.

The present invention may be embodied in many different forms and should not be construed as being limited to the exemplary embodiments set forth herein.

Thus, in some embodiments, well-known processing steps are generally not described in detail to avoid unnecessarily obscuring the description of the present invention.

It is noted that the use of any and all examples, or exemplary terms provided herein is intended merely to better illuminate the invention and is not a limitation on the scope of the exemplary embodiments of the present invention unless otherwise specified. The use of the terms "a" and "an" and "the" and similar referents in the context of describing the invention (especially in the context of the following claims) are to be construed to cover both the singular and the plural, unless otherwise indicated herein or clearly contradicted by context. The terms "comprising" and "comprises" are to be construed as open-ended terms (i.e., meaning "including, but not limited to,") to indicate any and all possible combinations of one or more of the associated components, steps, operations, and/or devices unless otherwise noted. It will also be understood that the term "and/or" as used herein refers to and encompasses any and all possible combinations of one or more of the associated listed items. In the drawings, like reference numerals denote like members.

In addition, the present invention will be described with reference to perspective views, cross-sectional views, and/or plan views, in which preferred embodiments of the invention are shown. Thus, the profile of an exemplary view may be modified according to manufacturing techniques and/or allowances. That is, the embodiments of the invention are not intended to limit the scope of the present invention but cover all changes and modifications that can be caused due to a change in manufacturing process. Thus, regions shown in the drawings are illustrated in schematic form and the shapes of the regions are presented simply by way of illustration and not as a limitation. In the drawings, the thickness of layers and regions are exaggerated or reduced for clarity.

A method of manufacturing a microarray according to embodiments of the present invention will now be described more fully with reference to the accompanying drawings, in which exemplary embodiments of the invention are shown.

First, the structures of microarrays manufactured using methods of manufacturing microarrays according to embodiments of the present invention will be described. FIG. 1 is a sectional view illustrating a microarray (100) manufactured using methods of manufacturing microarrays according to some embodiments of the present invention.

Referring to FIG. 1, the microarray 100 includes a substrate 110; a plurality of probe cell actives 120 disposed on the substrate 110; a plurality of oligomer probes 165 coupled onto the probe cell actives 120; and a probe cell isolation region 130 which isolates the probe cell actives 120 and does not couple with the oligomer probes 165.

As used herein, the term "oligomer" is a low-molecular weight polymer molecule consisting of two or more covalently bound monomers. Oligomers have a molecular weight of about 1,000 or less but the embodiments of the present invention are not limited thereto. The oligomer may include about 2-500 monomers, preferably about 5-30 monomers. The monomers may be, for example, nucleosides, nucleotides, amino acids, peptides, etc. according to the type of probes. In the current embodiment of the present invention, previously synthesized oligomer probes may be coupled to active regions, or oligomer probes may be synthesized on active regions by in-situ photolithography.

As used herein, the terms "nucleosides" and "nucleotides" include not only known purine and pyrimidine bases, but also, for example, methylated purines or pyrimidines, acylated purines or pyrimidines, etc. Furthermore, the "nucleosides" and "nucleotides" include not only known (deoxy)ribose, but also, for example, a modified sugar which contains a substitution of a halogen atom or an aliphatic group for at least one hydroxyl group or is functionalized with ether, amine, or the like.

As used herein, the term "amino acids" are intended to refer to not only naturally occurring, L-, D-, and nonchiral amino acids, but also to, for example, modified amino acids, amino acid analogs, etc.

As used herein, the term "peptides" refer to compounds produced by, for example, an amide bond between the carboxyl group of one amino acid and the amino group of another amino acid.

Accordingly, the oligomer probes 165 may be composed of, for example, two or more nucleosides, nucleotides, amino acids, peptides, or the like.

The substrate 110 may be a flexible or rigid substrate. Examples of a flexible substrate include a nylon membrane, a nitrocellulose membrane, a plastic film, etc. When a rigid substrate is used as the substrate 100, the substrate 100 may be a silicone substrate, a transparent glass (e.g., soda-lime glass) substrate, etc. The use of a silicone substrate or a transparent glass substrate as the substrate 100 is beneficial in that non-specific binding hardly occurs during hybridization. Furthermore, a transparent glass substrate is transparent to visible light and/or UV light, and thus, is beneficial in the detection of a fluorescent material. In addition, when a silicone substrate or a transparent glass substrate is used as the substrate 100, it is possible to employ various thin film formation processes and photolithography processes that have been well established and stably applied in the fabrication of semiconductor devices or liquid crystal display (LCD) panels.

The probe cell actives 120 are disposed on the substrate 110. The probe cell actives 120 may be made of a material that is substantially stable against hydrolysis upon hybridization assay, e.g., upon contacting with about pH 6-9 phosphate or Tris buffer. For example, the probe cell actives 120 may be made of a silicon oxide layer such as a plasma enhanced-TEOS (PE-TEOS) layer, a high density plasma (HDP) oxide layer, a P—$SiH_4$ oxide layer or a thermal oxide layer; silicate such as hafnium silicate or zirconium silicate; a metal oxynitride layer such as a silicon nitride layer, a silicon oxynitride layer, a hafnium oxynitride layer or a zirconium oxynitride layer; a metal oxide layer such as a titanium oxide layer, a tantalum oxide layer, an aluminum oxide layer, a hafnium oxide layer, a zirconium oxide layer or an indium tin oxide (ITO) layer; polyimide; polyamine; a metal such as gold, silver, copper or palladium; or a polymer such as polystyrene, polyacrylate or polyvinyl. With a view to a fabrication process, the probe cell actives 120 may be made of a material that has been stably applied in the fabrication of semiconductors or liquid crystal displays (LCDs).

The oligomer probes 165 are coupled to at least a portion of each surface of the probe cell actives 120. Functional groups 150 capable of coupling with the oligomer probes 165 or monomers for in-situ synthesis of the oligomer probes 165 may be present on portions of surfaces of the probe cell actives 120. The functional groups 150 present on surfaces of the probe cell actives 120 may be rendered inactive by capping with capping groups 155.

The oligomer probes 165 may be coupled to surfaces of the probe cell actives 120 by the functional groups 150 which are not blocked with the capping groups 155. Examples of the functional groups 150 include hydroxyl groups, aldehyde groups, carboxyl groups, amino groups, amide groups, thiol groups, halo groups, and sulfonate groups.

The functional groups 150 used for coupling of the oligomer probes 165 onto surfaces of the probe cell actives 120 may be provided together with linkers 140. The linkers 140 serve to mediate coupling between the probe cell actives 120 and the oligomer probes 165 and to provide a spatial margin for a free interaction (e.g., hybridization) between the microarray 100 and a target sample. Thus, the linkers 140 may have a sufficient length (e.g., about 6-50 atoms) to ensure a free interaction between the oligomer probes 165 and a target sample.

The linkers 140 may be made of a material including coupling groups capable of coupling with the probe cell actives 120 and the functional groups 150 capable of coupling with the oligomer probes 165 or monomers for probe synthesis. The linkers 140 are coupled and immobilized on the probe cell actives 120 by the coupling groups and coupled with the oligomer probes 165 or monomers for probe synthesis by the functional groups 150. As described above, the functional groups 150 which do not couple with the oligomer probes 165 or the monomers for probe synthesis may be rendered inactive by capping with the capping groups 155.

When the probe cell actives 120 are made of silicon oxide, silicate, or silicon oxinitride, the coupling groups of the linkers 140 may include, for example, silicone groups capable of reacting with Si(OH) groups on surfaces of the probe cell actives 120 to produce siloxane (Si—O) bonds. Examples of the coupling groups of the linkers 140 include —Si(OMe)$_3$, —SiMe(OMe)$_2$, —SiMeCl$_2$, —SiMe(OEt)$_2$, —SiCl$_3$, —Si(OEt)$_3$, and the like. When the probe cell actives 120 is made of metal oxide, the coupling groups of the linkers 140 may include, for example, metal alkoxide groups or metal carboxylate groups. When the probe cell actives 120 are made of silicon nitride, silicon oxynitride, metal oxynitride, polyimide, or polyamine, the coupling groups of the linkers 140 may include, for example, anhydride groups, acid chloride groups, alkyl halide groups, or chlorocarbonate groups. When the probe cell actives 120 are made of metal, the coupling groups of the linkers 140 may include, for example, sulfide groups, selenide groups, arsenide groups, telluride groups, or antimonide groups. When the probe cell actives 120 are made of a polymer, the coupling groups of the linkers 140 may include, for example, acrylic groups, styryl groups, or vinyl groups.

Meanwhile, when a material constituting the probe cell actives 120 includes the functional groups 150, the linkers 140 may be omitted. Even when the functional groups 150 are not included in a material constituting the probe cell actives 120, they can be directly provided on the surfaces of the probe cell actives 120 by a surface treatment. The surface treatment may be, for example, ozonolysis, acid treatment, base treatment, or the like. That is, the formation of the linkers 140 is optional.

The probe cell isolation region 130 is a region which does not couple with the oligomer probes 165. A surface of the substrate 110 is directly exposed in the probe cell isolation region 130. The probe cell actives 120 are separated from each other by the probe cell isolation region 130. Oligomer probes having the same sequence may be coupled to each one of the probe cell actives 120. Different probe cell actives 165 may couple with oligomer probes having different sequences.

Hereinafter, a method of manufacturing a microarray as illustrated in FIG. 1 will be described.

FIGS. 2 through 10 are sectional views of intermediate structures for illustrating a method of manufacturing a microarray according to an embodiment of the present invention.

Figure 2:
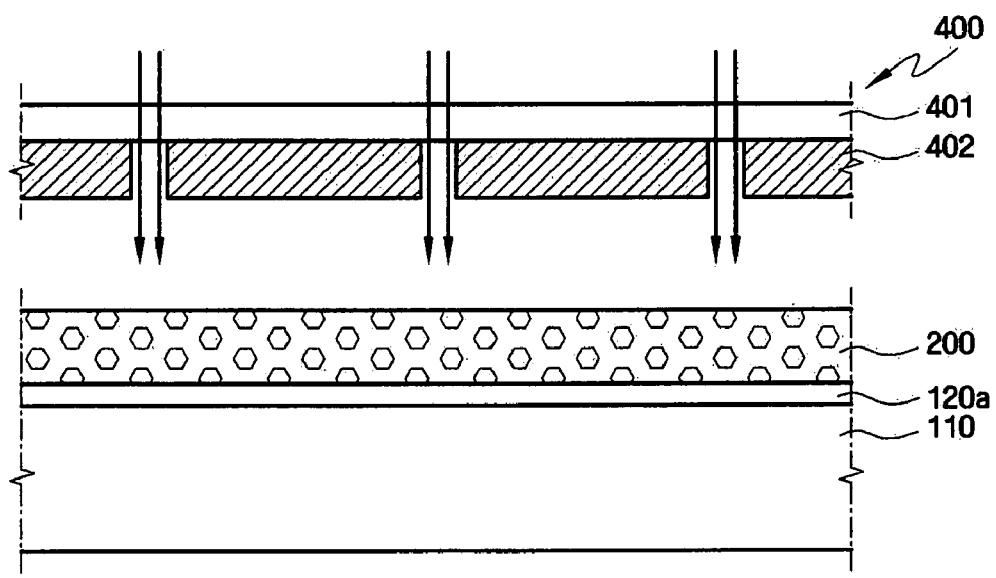
FIGS. 2 through 10 are sectional views of intermediate structures for illustrating a method of manufacturing a microarray according to an exemplary embodiment of the present invention.

Referring to FIG. 2, first, a probe cell active formation film 120a is formed on a substrate 110. The probe cell active film 120a is preferably made of, for example, a silicon oxide film such as a PE-TEOS film, a HDP oxide film, a P—SiH$_4$ oxide film or a thermal oxide film; silicate such as hafnium silicate or zirconium silicate; a metallic oxynitride film such as a silicon nitride film, a silicon oxynitride film, a hafnium oxynitride film or a zirconium oxynitride film; a metal oxide film such as ITO; a metal such as gold, silver, copper or palladium; polyimide; polyamine; or polymers such as polystyrene or polyacrylate. The formation of the probe cell active film 120a may be performed using, for example, a deposition method that has been stably applied in a semiconductor or LCD fabrication process, e.g., CVD (Chemical Vapor Deposition), SACVD (Sub-Atmospheric CVD), LPCVD (Low Pressure CVD), PECVD (Plasma Enhanced CVD), sputtering, spin-coating, or slit coating.

Figure 3:
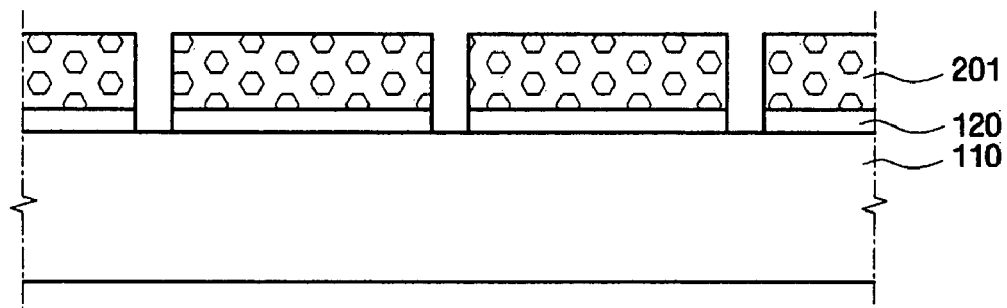

Next, a photoresist film 200 is formed on the probe cell active formation film 120a and exposed to light using a photomask 400 including a mask body 401 made of a transparent material and a light-shielding pattern 402 formed on the mask body 401 and defining probe cell actives (see 120 of FIG. 3).

Referring to FIG. 3, together with FIG. 2, after being exposed to light, the photoresist film 200 is developed to form a photoresist pattern 201. Then, the probe cell active formation film 120a is etched using the photoresist pattern 201 as an etching mask to form a plurality of probe cell actives 120. At this time, a region free from the probe cell active formation film 120a exposes a surface of the substrate 110 and serves as a probe cell isolation region (see 130 of FIG. 4) isolating the probe cell actives 120.

Figure 4:
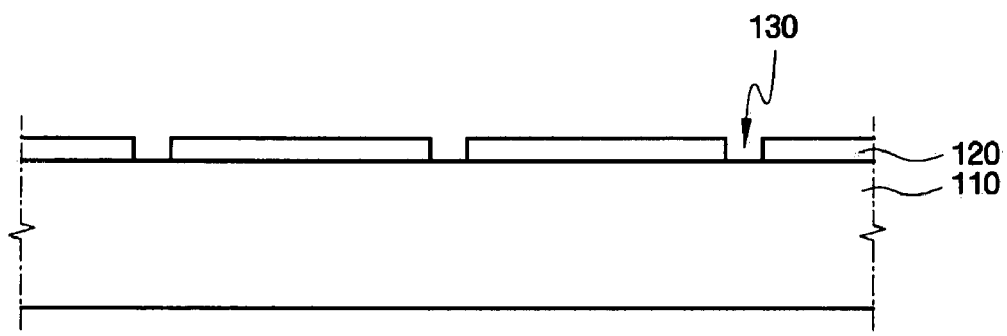

Referring to FIG. 4 and FIG. 3, the photoresist pattern 201 is removed to complete the probe cell actives 120. For example, when the probe cell actives 120 are made of silicon oxide, SiOH groups capable of coupling with oligomer probes are exposed on surfaces of the probe cell actives 120.

Figure 5:
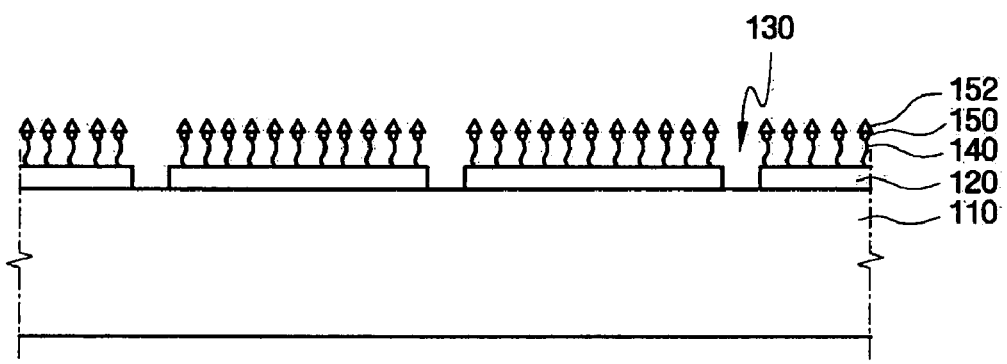

Referring to FIG. 5 and FIG. 4, in a case where it is necessary to incorporate functional groups having better reactivity with oligomer probes (or monomers for in-situ synthesis of the oligomer probes) than the SiOH groups of the probe cell actives 120, linkers 140 are formed. The linkers 140 may be comprised of first linkers and second linkers.

In detail, first linkers that can be coupled to the probe cell actives 120 but cannot be coupled to an exposed surface of the substrate 110 of the probe cell isolation region 130 are formed on surfaces of the probe cell actives 120. For example, the first linkers may have functional groups 150 (e.g., COH groups) having better reactivity with oligomer probes (or monomers for probe synthesis) than the SiOH groups.

Next, second linkers having acid-labile protecting groups 152 are attached to the COH groups of the first linkers. The second linkers may be, for example, phosphoramidites having the acid-labile protecting groups 152. The acid-labile protecting groups 152 may be t-BOC (tert-butoxycarbonyl) groups or DMT (dimethoxytrityl) groups.

Next, surface-exposed functional groups (e.g., the SiOH and COH groups) that remain unreacted with the second linkers are rendered inactive by capping to prevent the unreacted functional groups from generating noise in oligomer probes. The capping can be performed using a capping agent including, for example, capping groups (see 155 of FIG. 1) capable of acetylating the SiOH and COH groups. This completes the linkers 140 including the functional groups 150 which are protected with the acid-labile protecting groups 152 and which can couple with oligomer probes or monomers for probe synthesis, as illustrated in FIG. 5.

Figure 6:
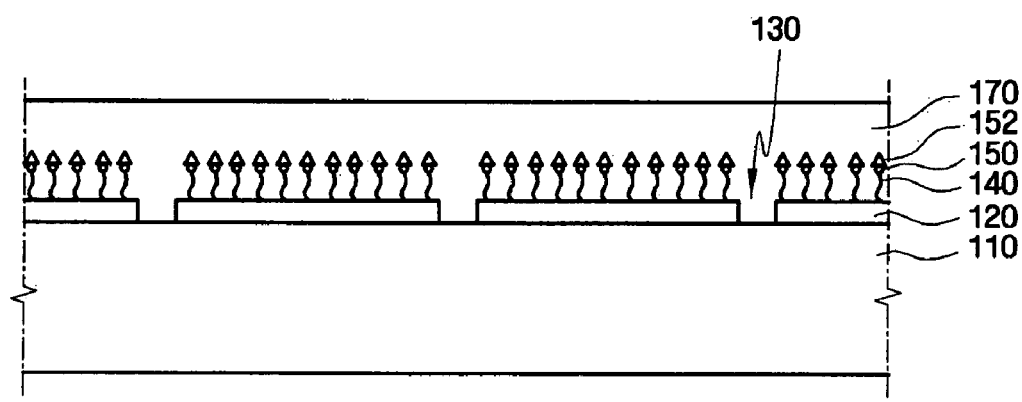

Referring to FIG. 6 and FIG. 5, a PhotoAcid Generator (PAG) is supplied onto the substrate 110. A material contained in photoresist or an organic film used in a semiconductor or LCD fabrication process may be used as the PAG. For example, the PAG may be supplied in the form of a solution (hereinafter, referred to as "PAG solution") obtained by dissolving about 10-50% (w/v) of the PAG in an organic solvent (e.g., N-methylpyrrolidone (NMP)). That is, a PAG solution 170 is supplied onto the substrate 110 using a dispensing process, a spin-coating process, or the like.

Figure 7A:
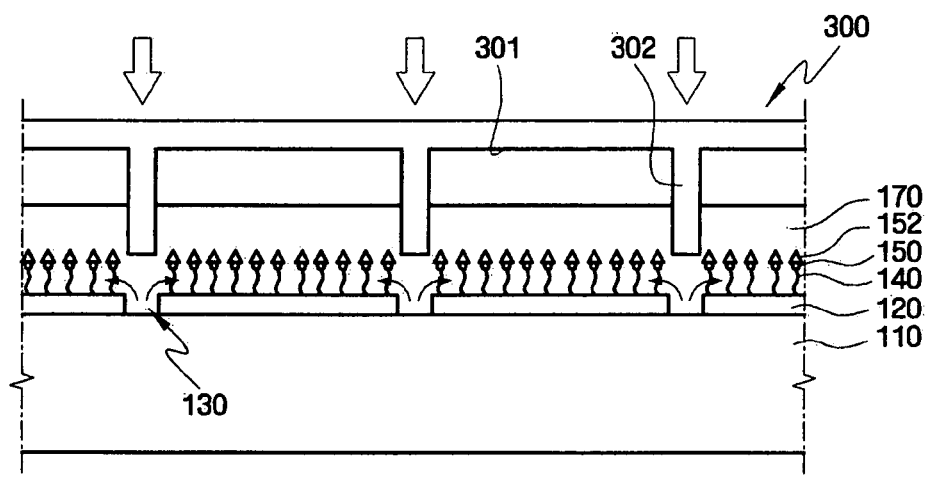
Figure 7B:
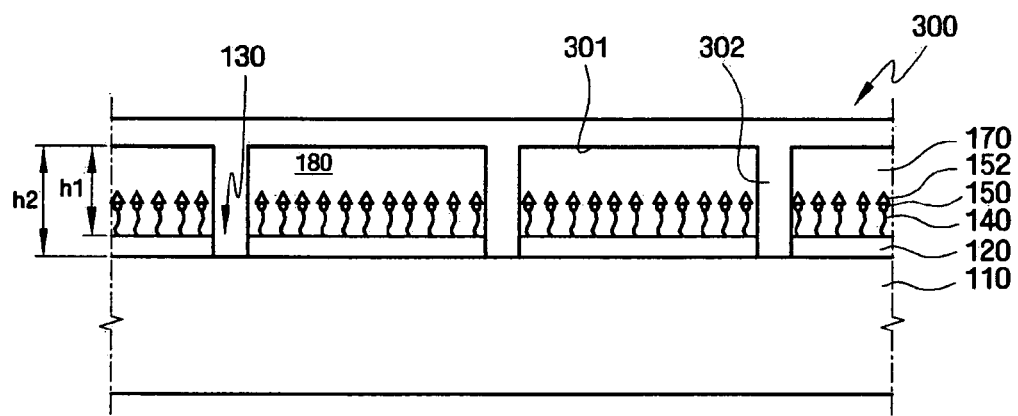

FIG. 7A is a sectional view illustrating a substrate structure during pressing with an imprint template, and FIG. 7B is a sectional view illustrating a substrate structure after pressing with an imprint template. Referring to FIGS. 7A, 7B, and FIG. 6, an imprint template 300 including a convex region 302 and a plurality of concave regions 301 surrounding the convex 302 is placed over the substrate 110 on which the PAG solution 170 is supplied. The pattern of the convex 302 of the imprint template 300 may be substantially the same as that of the probe cell isolation region 130, and the patterns of the concaves 301 may be substantially the same as those of the probe cell actives 120. When a front exposure in which light is irradiated from the front of the substrate 110 is executed in a subsequent process, the imprint template 300 may be made of a transparent material. When a rear exposure in which light is irradiated from the back of the substrate 110 is executed, the imprint template 300 does not necessarily satisfy transparency.

After the imprint template 300 is placed over the substrate 110, it is pressed toward the substrate 110. For example, the convex 302 of the imprint template 300 is correspondingly aligned with an exposed upper surface of the substrate 110 in the probe cell isolation region 130, and the imprint template 300 is pressed toward the substrate 110 until the convex 302 contacts with or is adjacent to the upper surface of the substrate 110. As a result, a plurality of reaction zones 180 are defined on the substrate 110 by upper surfaces of the probe cell actives 120, and the convex 302 and the concaves 301 of the imprint template 300. The reaction zones 180 may be defined in a one-to-one correspondence with the probe cell actives 120. Meanwhile, during pressing with the imprint template 300, the PAG solution 170 in the probe cell isolation region 130 moves toward the reaction zones 180 on the probe cell actives 120 as illustrated in FIG. 7A.

When the imprint template 300 is pressed toward the substrate 110 so that the convex 302 contacts with the upper surface of the substrate 110, the reaction zones 180 are spatially completely separated from each other. When the imprint template 300 is pressed toward the substrate 110 so that the convex 302 is adjacent to the upper surface of the substrate 110, there is a space between the end of the convex 302 of the imprint template 300 and the upper surface of the substrate 110. In this case, it is preferable to control a distance between the imprint template 300 and the substrate 110 so that the movement of acids generated from the PAG solution 170 from one to another of the reaction zones 180 through the space never or hardly occurs.

Meanwhile, the height $h_1$ of the reaction zones 180 is associated with the height $h_2$ of the convex 302 of the imprint template 300. The height $h_1$ of the reaction zones 180 may range from about 500 to about 4,000 nanometers (nm), preferably from about 1,000 to about 2,000 nm, to facilitate subsequent photo-induced acid generation and removal of the acid-labile protecting groups 152. Thus, for example, when a distance between an exposed surface of the substrate 110 and upper surfaces of the probe cell actives 120 is about 1,000 nm, the height $h_2$ of the convex 302 may range from about 1,500 to about 5,000 nm, preferably from about 2,000 to about 3,000 nm.

Figure 8:
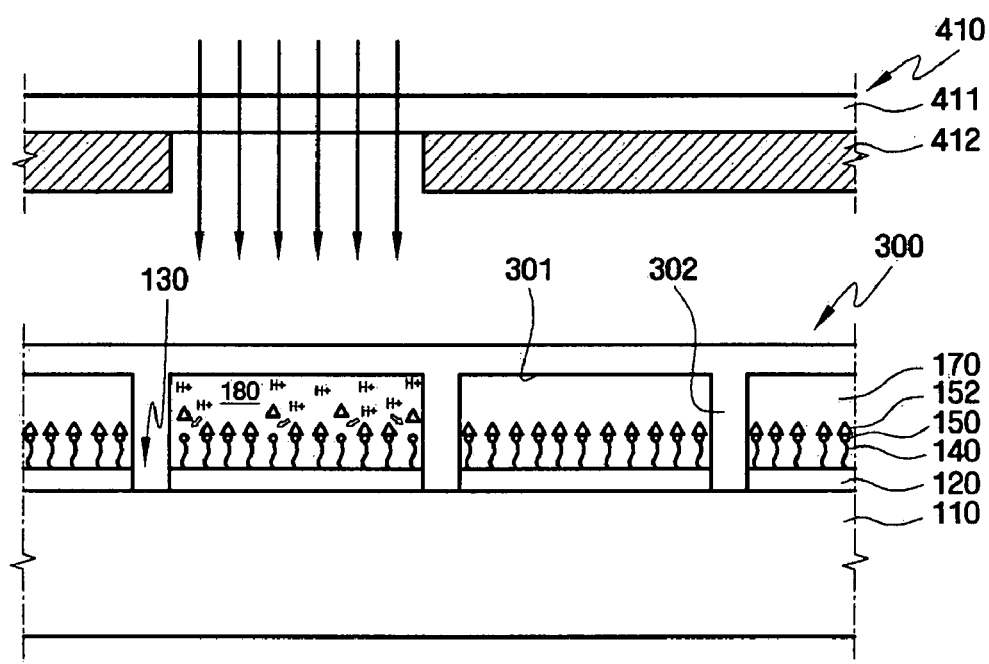

Next, referring to FIG. 8, together with FIGS. 7A and 7B, the reaction zones 180 are selectively exposed to light.

In detail, when the imprint template 300 is made of a transparent material, as illustrated in FIG. 8, a photomask 410 is placed over the substrate 110 on which the imprint template 300 is disposed. The photomask 410 includes a transparent mask body 411 and a light-shielding pattern 412 disposed on the mask body 411. A portion(s) of the mask body 411 which is not covered with the light-shielding pattern 412, and through which light passes, is correspondingly aligned with a reaction zone(s) (hereinafter, referred to as "target reaction zone(s)") intended for subsequent coupling of the functional groups 150 with oligomer probes or monomers for probe synthesis. When the substrate 110 is a transparent substrate, it should be understood that the photomask 410 can be disposed below the substrate 110.

Next, the target reaction zone(s) is exposed to light through the photomask 410. As a result, PAG dissolved in the PAG solution 170 of the target reaction zone(s) is activated, thereby generating acids H+. At this time, the exposure amount required for PAG activation may be about 300 to about 1,000 millijoules (mJ), preferably, 500 mJ, which is much smaller than an exposure amount (5,000 mJ) required for removal of photo-labile protecting groups. This shows that an exposure time can be significantly reduced using acid-labile protecting groups rather man using photo-labile protecting groups.

The acids H+ generated by the PAG serve to remove the acid-labile protecting groups 152 from ends of the linkers 140 in the target reaction zone(s). As a result, the functional groups 150 capable of coupling with oligomer probes or monomers for probe synthesis are exposed on the deprotected ends of the linkers 140. The target reaction zone(s) is filled with the PAG solution 170, and thus, the generated acids H+ can freely move in the target reaction zone(s), thereby achieving an improved deprotection yield.

As described above, the reaction zones 180 are spatially completely separated, or the movement of the acids H+ from one to another of the reaction zones 180 never or hardly occurs. Thus, reaction zones (hereinafter, referred to as "non-target reaction zones") which do not participate in subsequent coupling of the functional groups 150 with oligomer probes or monomers for probe synthesis are not exposed to light. As a result, in the non-target reaction zones, acid (H+) generation does not occur, and an inflow of acids (H+) from the exposed target reaction zone(s) never or hardly occurs. Therefore, in the non-target reaction zones, unwanted deprotection of the functional groups 150 attached to ends of the linkers 140 on the probe cell actives 120 does not occur.

Meanwhile, as a modified embodiment of the selective exposure using the photomask 410, the reaction zones 180 may be selectively exposed to light using an exposure machine having selective exposure capability, instead of using the photomask 410.

Figure 9:
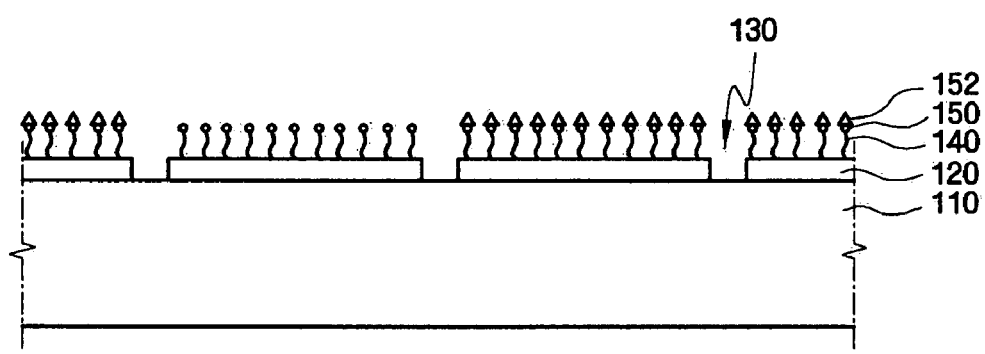

Next, referring to FIG. 9 and FIG. 8, the imprint template 300 is removed from the substrate 110, and the PAG solution 170 remaining on the substrate 110 is removed.

Figure 10:
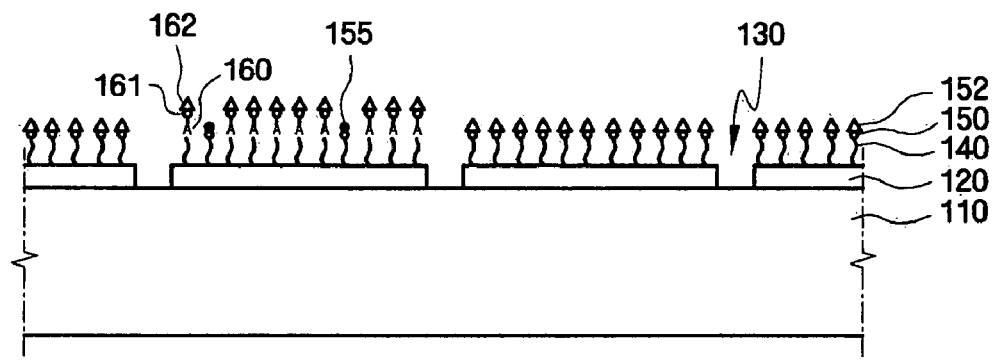

Next, referring to FIG. 10 and FIG. 9, desired oligomer probes or monomers for probe synthesis are coupled to the functional groups 150 exposed on ends of the linkers 140. For example, with respect to in-situ synthesis of oligonucleotide probes, nucleotide phosphoramidite monomers including a nucleobase selected from adenine (A), guanine (G), thymine (T), cytosine (C), and uracil (U) are coupled to functional groups. FIG. 10 illustrates that adenine (A) nucleotide phosphoramidite monomers 160 are coupled to functional groups 150. In the case of adding another monomer to a previously coupled monomer, the previously coupled monomer may be, for example, a nucleotide phosphoramidite monomer containing an acid-labile protecting group.

As a result of the coupling, the adenine (A) nucleotide phosphoramidite monomers 160 containing acid-labile protecting groups 162 are immobilized on a targeted one(s) of the probe cell actives 120. At this time, unwanted immobilization of nucleotide phosphoramidite monomers on non-targeted ones of the probe cell actives 120 is prevented as the functional groups 150 attached to the linkers 140 on the non-targeted probe cell actives are not deprotected as described above. Therefore, oligomer probes can be prevented from having an unwanted sequence or noise.

Next, unreacted functional groups are rendered inactive by capping with capping groups 155, and oxidation of phosphite triester structures between phosphoramidites and 5'-hydroxyl groups to phosphate structures is performed. For example, the capping may be performed using acetic anhydride and/or N-methylimidazole. For example, the oxidation may be performed using iodine.

The nucleotide phosphoramidite monomers 160 include functional groups 161 capable of covalently or non-covalently binding with other nucleotide phosphoramidite monomers. The functional groups 161 are protected with the acid-labile protecting groups 162. Thus, with respect to the functional groups 150 and 161 formed on the substrate 110, the probe cell actives 120 immobilized with the nucleotide phosphoramidite monomers 160 including the functional groups 161 protected with the acid-labile protecting groups 162 are substantially the same as the probe cell actives 120 immobilized with the functional groups 150 which are present on ends of the linkers 140 and which are protected with the acid-labile protecting groups 152 in that the functional groups 150 and 161 capable of binding with nucleotide phosphoramidite monomers are respectively protected with the acid-labile protecting groups 152 and 162. That is, the structure of FIG. 10 is substantially the same as that of FIG. 5 in terms of functional groups which are formed on an upper surface of a substrate and which participate in a coupling reaction.

Thus, it can be readily understood that the coupling of other nucleotide phosphoramidite monomers can be performed in substantially the same manner as described above with reference to FIGS. 6 through 10. It can also be readily understood that when the steps of FIGS. 6 through 10 are repeated, oligonucleotide probes having different sequences can be synthesized on probe cell actives so that oligonucleotide probes having the same sequence are coupled to each one of the probe cell actives.

Hereinafter, a method of manufacturing the microarray illustrated in FIG. 1 according to another embodiment of the present invention will be described with reference to FIGS. 11 and 12.

Figure 11:
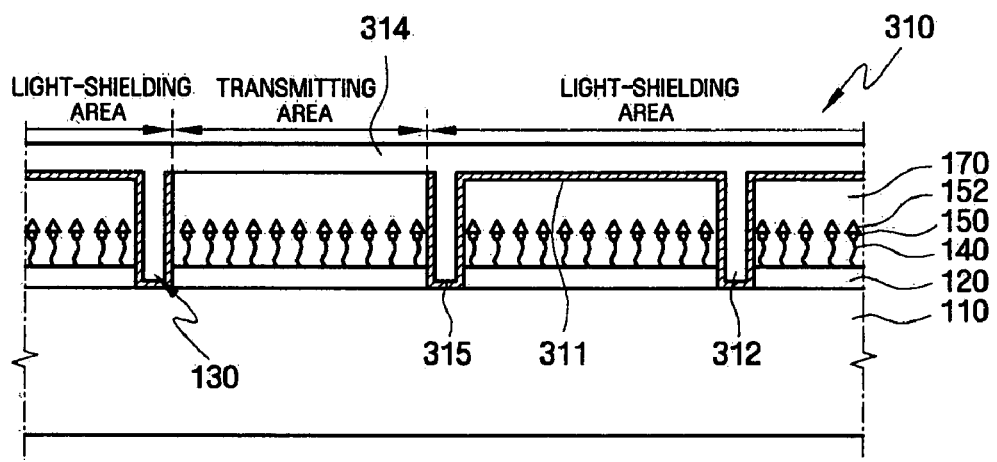
FIGS. 11 and 12 are sectional views of intermediate structures for illustrating a method of manufacturing a microarray according to an exemplary embodiment of the present invention.
Figure 12:
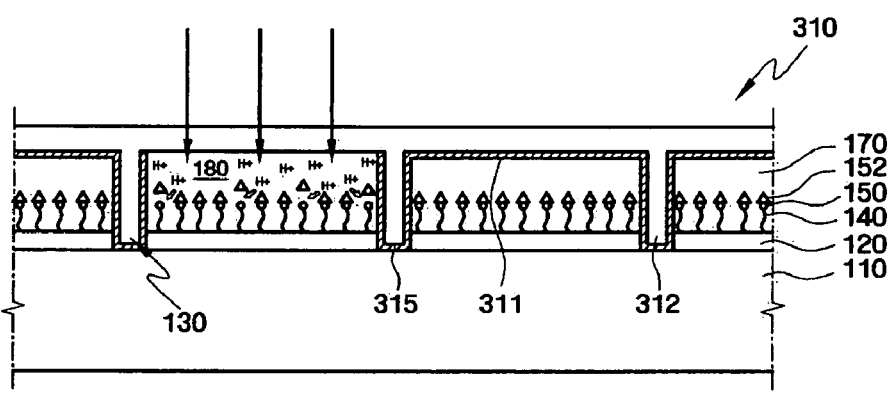

FIGS. 11 and 12 are sectional views of intermediate structures for illustrating a method of manufacturing a microarray according to another embodiment of the present invention.

Referring to FIG. 11, probe cell actives 120 and a probe cell isolation region 130 are formed on a substrate 110, linkers 140 are formed on the probe cell actives 120, and a PAG solution 170 is supplied onto the substrate 110, in the same manner as described above with reference to FIGS. 2 through 6.

Next, as illustrated in FIG. 11, an imprint template 310 including a convex 312 and a plurality of concaves 311 surrounded by the convex 312 is placed over the PAG solution 170. The imprint template 310 used in the current embodiment of the present invention includes transmitting areas and light-shielding areas, unlike the imprint template according to the previous embodiment of the present invention. For this purpose, the imprint template 310 may include a template body 314 made of a transparent material and a light-shielding pattern 315 formed on the template body 314. For example, a concave(s) defining a reaction zone(s) (see 180 of FIG. 12) to be exposed to light includes only the transparent template body 314, and concaves defining reaction zones to be unexposed are made of a light-shielding material, or include a light-shielding pattern 315 made of a light-shielding material which is present on an upper or lower surface of the template body 314. The convex 312 of the imprint template 310 may be made of any material as it is not concerned with an exposure area. However, to prevent obliquely incident light or reflected light from the substrate 110 from entering adjacent reaction zones and acting as noise, the convex 312 may be made of a light-shielding material or surface-coated with a light-shielding material (see 315 of FIG. 11).

The shape, size, etc. of the imprint template 310 of the current embodiment of the present invention are the same as those of the imprint template (see 300 of FIGS. 7A and 7B) of the previous embodiment of the present invention except that the imprint template 310 includes the transmitting areas and the light-shielding areas.

Next, referring to FIG. 12, reaction zones 180 are selectively exposed to light through the imprint template 310. As the imprint template 310 serves as a photomask for selective exposure, there is no need to use a separate photomask or an exposure machine having selective exposure capability, thereby simplifying a manufacturing process and reducing manufacturing costs.

The microarray manufacturing method according to the current embodiment of the present invention differs from that according to the previous embodiment of the present invention only in that an exposure process is selectively performed using an imprint template including a transmitting area and a light-shielding area, and thus, the selective exposure result of the current embodiment of the present invention is the same as that of the previous embodiment of the present invention. Thus, it can be readily understood that the subsequent coupling of nucleotide phosphoramidite monomers is performed in the same manner as that of the previous embodiment of the present invention.

Figure 13:
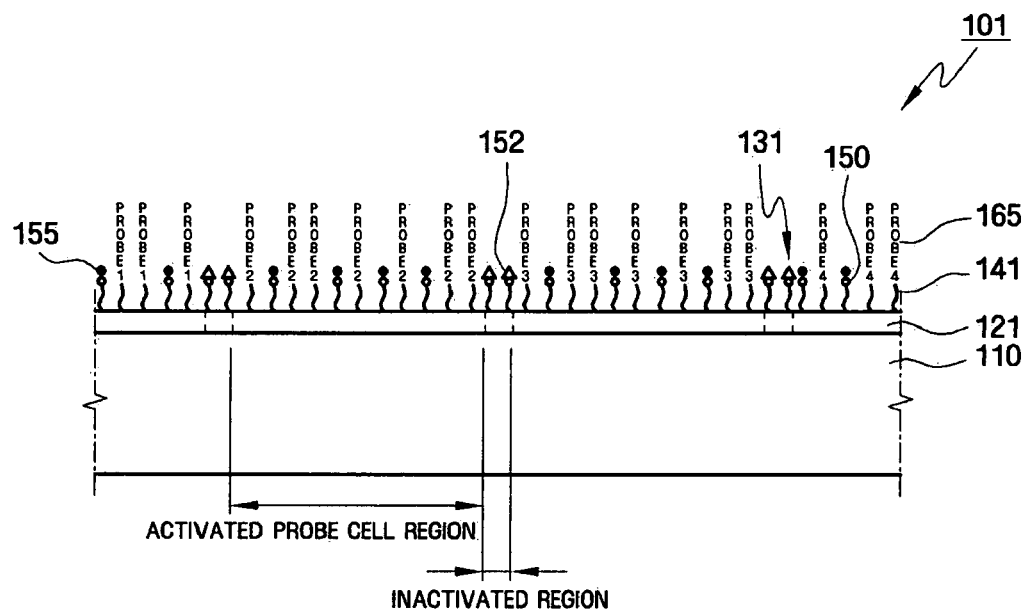
FIG. 13 is a sectional view illustrating a microarray manufactured using methods of manufacturing microarrays according to exemplary embodiments of the present invention.

FIG. 13 is a sectional view illustrating a microarray (101) manufactured using methods of manufacturing microarrays according to some embodiments of the present invention.

Referring to FIG. 13, the microarray 101 according to the illustrated embodiment of the present invention differs from the microarray 100 of the embodiment illustrated in FIG. 1 in that a probe cell active film 121 and linkers 141 formed on the probe cell active film 121 are not separated physically. That is, no probe cell active patterns are formed, and the probe cell active film 121 is divided into a plurality of activated probe cell regions and inactivated regions according to the presence or absence of oligomer probes 165. The oligomer probes 165 are absent in the inactivated regions, and functional groups 150 protected with acid-labile protecting groups 152 are immobilized on ends of the linkers 141.

Figure 14:
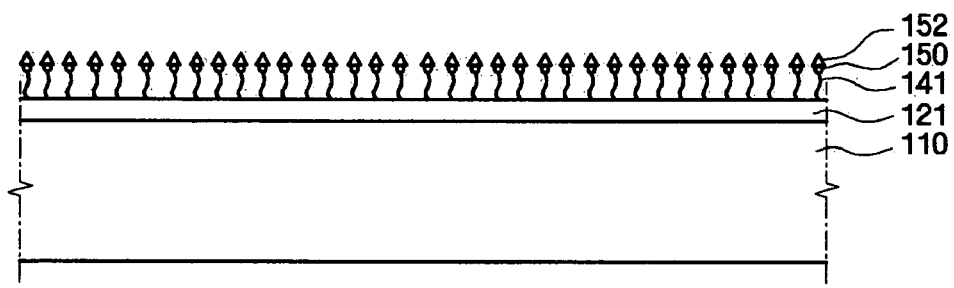
FIGS. 14 and 15 are sectional views of intermediate structures for illustrating a method of manufacturing the microarray of FIG. 13.
Figure 15:
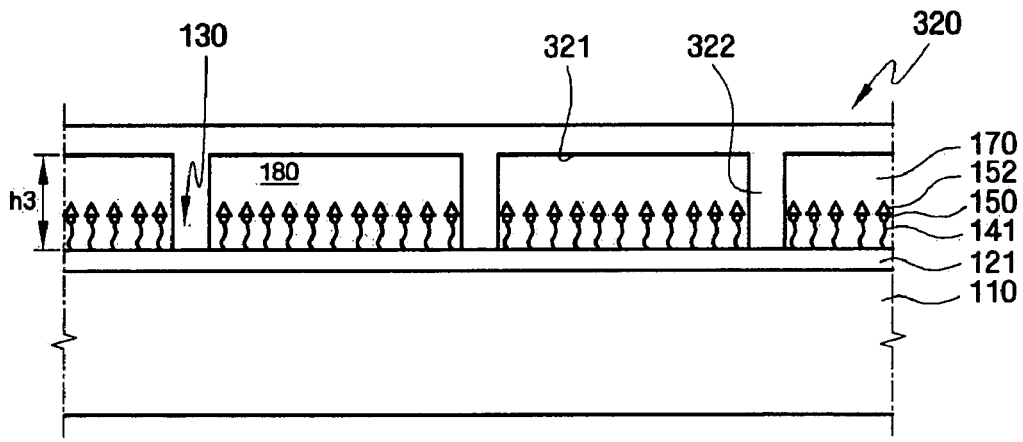

FIGS. 14 and 15 are sectional views of intermediate structures for illustrating a method of manufacturing the microarray of FIG. 13.

Referring to FIG. 14, a probe cell active film 121, first linkers, and second linkers having acid-labile protecting groups 152 are sequentially formed on a substrate 110 without forming probe cell active patterns. Functional groups 150 protected with the acid-labile protecting groups 152 and capable of coupling with oligomer probes or monomers for probe synthesis are uniformly immobilized on the probe cell active film 121 regardless of film areas.

Referring to FIG. 15, together with FIG. 14, a PAG solution 170 is supplied onto the substrate 110, and an imprint template 320 is disposed on the substrate 110 so that a convex 322 contacts with an upper surface of the probe cell active film 121. At this time, the height h3 of the convex 322 is adjusted to be smaller than the height h2 of the convex 302 of FIG. 7B by the thickness of the probe cell active film 121 to provide reaction zones 180 having the same height as those of FIG. 7B.

The functional groups 150 capable of coupling with oligomer probes or monomers for probe synthesis and being protected with the acid-labile protecting groups 152 are also present on upper surfaces of the probe cell active film 121 contacting with the convex 322 of the imprint template 320. However, a portion of the probe cell active film 121 contacting with the convex 322 does not form reaction zones 180, and thus, is not filled with the PAG solution 170 and not exposed to light during a subsequent exposure process. Thus, the functional groups 150 immobilized on the portion of the probe cell active film 121 contacting with the convex 322 are not deprotected. That is, inactivated regions 130 can be defined without patterning the probe cell active film 121, and no noise generation occurs in the inactivated regions 131.

After placing the imprint template 320 on the substrate 110, substantially the same processes as described above with reference to FIGS. 9 through 11 are performed to thereby manufacture a microarray. A reference numeral "321" refers to a concave of the imprint template 320.

As a modified embodiment of the current embodiment of the present invention, when using an imprint template including a light-shielding area and a transmitting area as illustrated in FIG. 11, the use of a photomask during the subsequent selective exposure process may be omitted.

Figure 16:
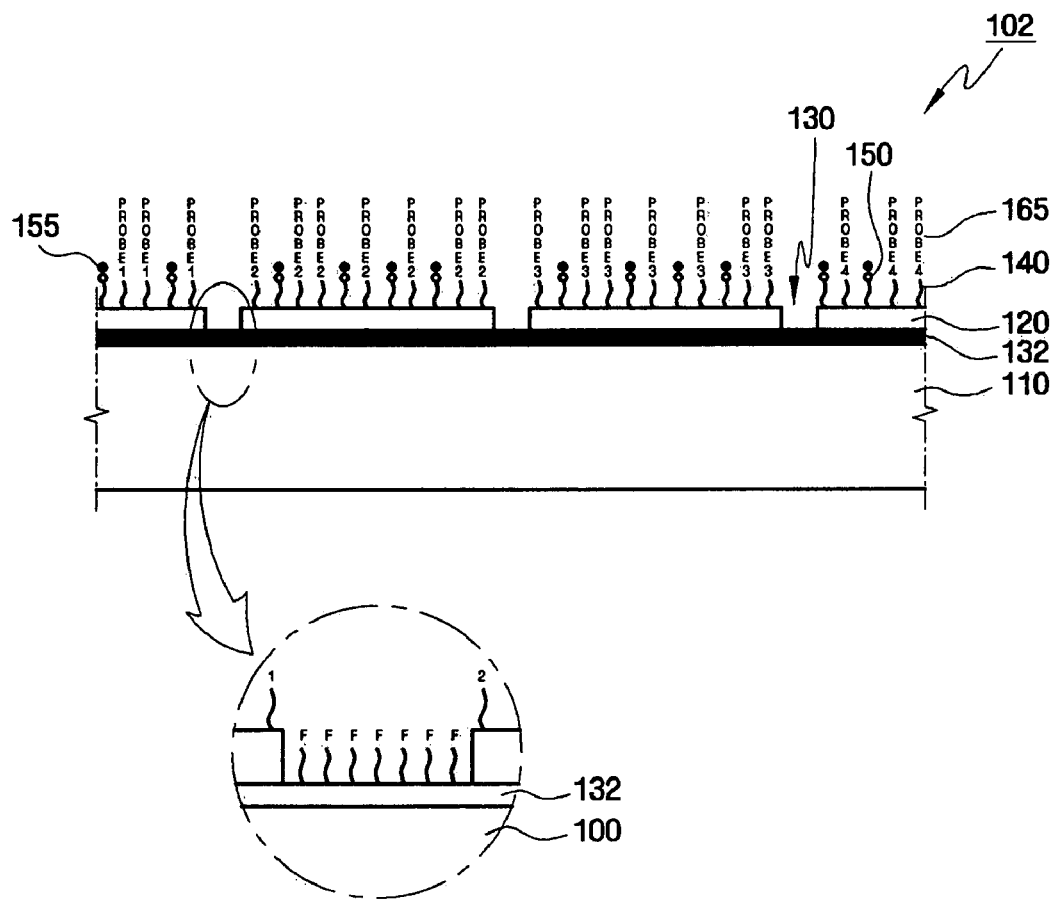
FIG. 16 is a sectional view illustrating a microarray manufactured using methods of manufacturing microarrays according to exemplary embodiments of the present invention.

FIG. 16 is a sectional view illustrating a microarray (102) manufactured using methods of manufacturing microarrays according to some embodiments of the present invention.

Referring to FIG. 16, the microarray 102 according to the illustrated embodiment of the present invention includes a coupling blocking film 132 formed on the entire surface of a substrate 110, and probe cell actives 120 are formed on the coupling blocking film 132, unlike the microarray 100 of the embodiment illustrated in FIG. 1. The coupling blocking film 132 is exposed in a probe cell isolation region 130. The coupling blocking film 132 may be made of, for example, fluorine-containing fluoride such as fluorosilane. The coupling blocking film 132 may also be a silicide film, a polysilicone film, or an epitaxial film of silicon (Si) or silicon-Germanium (SiGe). In the current embodiment of the present invention, functional groups 150 capable of coupling with oligomer probes 165 or monomers for probe synthesis are absent in the probe cell isolation region 130 due to the presence of the coupling blocking film 132, thereby more efficiently preventing noise generation.

Figure 17:
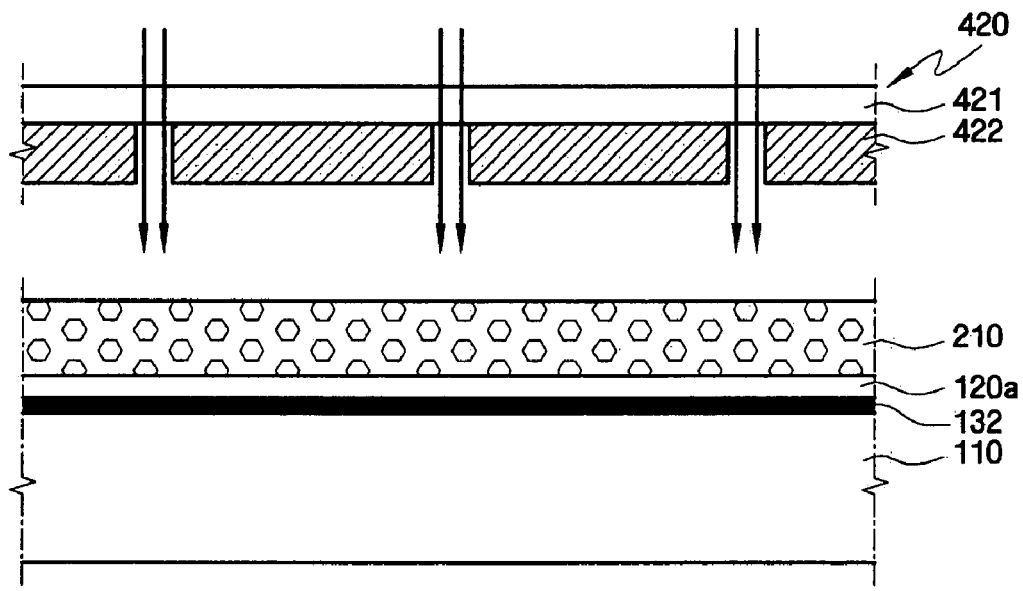
FIGS. 17 and 18 are sectional views of intermediate structures for illustrating a method of manufacturing the microarray of FIG. 16.
Figure 18:
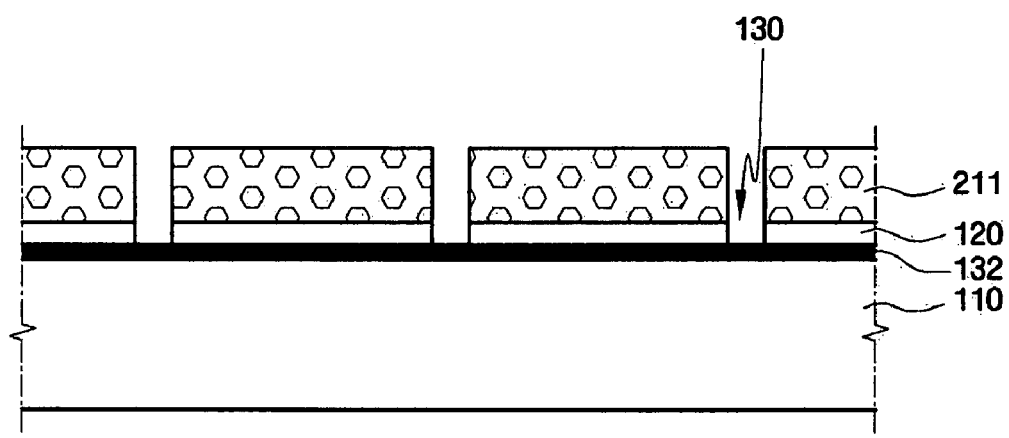

FIGS. 17 and 18 are sectional views of intermediate structures for illustrating a method of manufacturing the microarray of FIG. 16.

Referring to FIG. 17, the coupling blocking film 132, a probe cell active film 120a, and a photoresist film 210 are sequentially formed on the substrate 110. Then, the photoresist film 210 is exposed to light using a photomask 420 including a transparent mask body 421 and a light-shielding pattern 422 formed on the mask body 421 and defining probe cell actives (see 120 of FIG. 18).

Referring to FIG. 18, together with FIG. 17, the exposed photoresist film 210 is developed to form a photoresist pattern 211, and the probe cell active film 120a is etched using the photoresist pattern 211 as an etching mask to form the probe cell actives 120. The coupling blocking film 132 is exposed between the probe cell actives 120 to define the probe cell isolation region 130. The subsequent processes are performed in substantially the same manner as described above with reference to FIGS. 4 through 10 or FIGS. 11 and 12.

Figure 19:
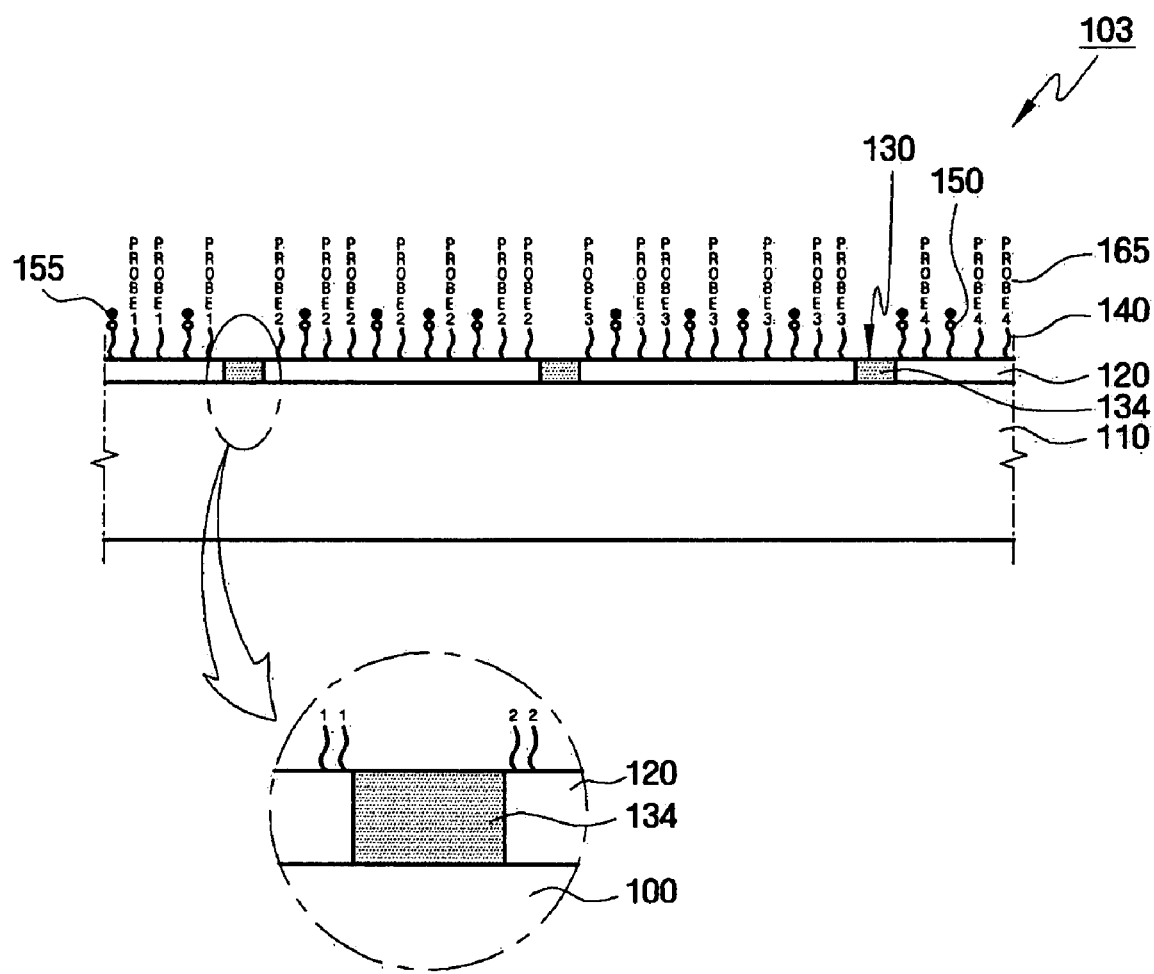
FIG. 19 is a sectional view illustrating a microarray manufactured using methods of manufacturing microarrays according to exemplary embodiments of the present invention.

FIG. 19 is a sectional view illustrating a microarray (103) manufactured using methods of manufacturing microarrays according to some embodiments of the present invention;

Referring to FIG. 19, the microarray 103 according to the illustrated embodiment of the present invention is structured such that a probe cell isolation region 130 is filled with a coupling blocking filler 134 which has characteristics preventing the coupling of oligomer probes 165 or monomers for probe synthesis, unlike the microarray 100 of the embodiment illustrated in FIG. 1. The coupling blocking filler 134 may be made of, for example, fluorine-containing fluoride, polysilicone, or the like. According to the current embodiment of the present invention, the probe cell isolation region 130 is filled with the coupling blocking filler 134, and thus, functional groups 150 capable of coupling with the oligomer probes 165 or monomers for probe synthesis are absent on a surface of the microarray 103, thereby more efficiently preventing noise generation.

Figure 20:
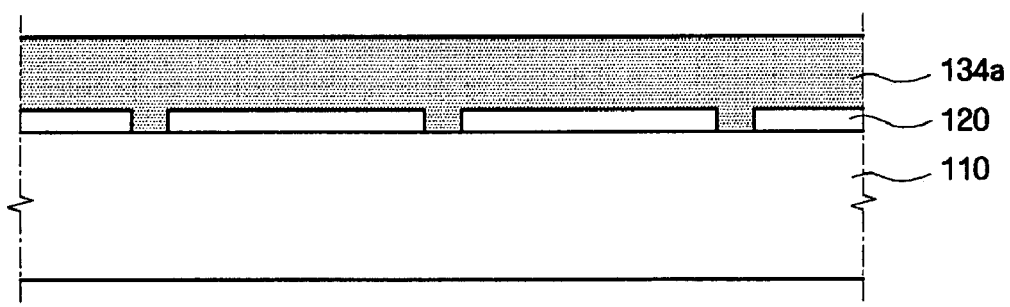
FIG. 20 is a sectional view of an intermediate structure for illustrating a method of manufacturing the microarray of FIG. 19.

FIG. 20 is a sectional view of an intermediate structure for illustrating a method of manufacturing the microarray of FIG. 19.

Referring to FIG. 20, probe cell actives 120 are formed in the same manner as described above with reference to FIGS. 2 through 4, and a filler film 134a filling an area defined between the probe cell actives 120 is formed. The filler film 134a may be made of a material having characteristics preventing the coupling of oligomer probes and good gap-filling characteristics, e.g., fluorosilane or polysilicone.

Next, the filler film 134a is planarized by, for example, a Chemical Mechanical Polishing (CMP) or etch-back process to expose surfaces of the probe cell actives 120, thereby completing a coupling blocking filler (see 134 of FIG. 19) which is filled in the area defined between the probe cell actives 120 and prevents the coupling of oligomer probes or monomers for probe synthesis. The subsequent processes are performed in substantially the same manner as described above with reference to FIGS. 5 through 10 or FIGS. 11 and 12.

Figure 21:
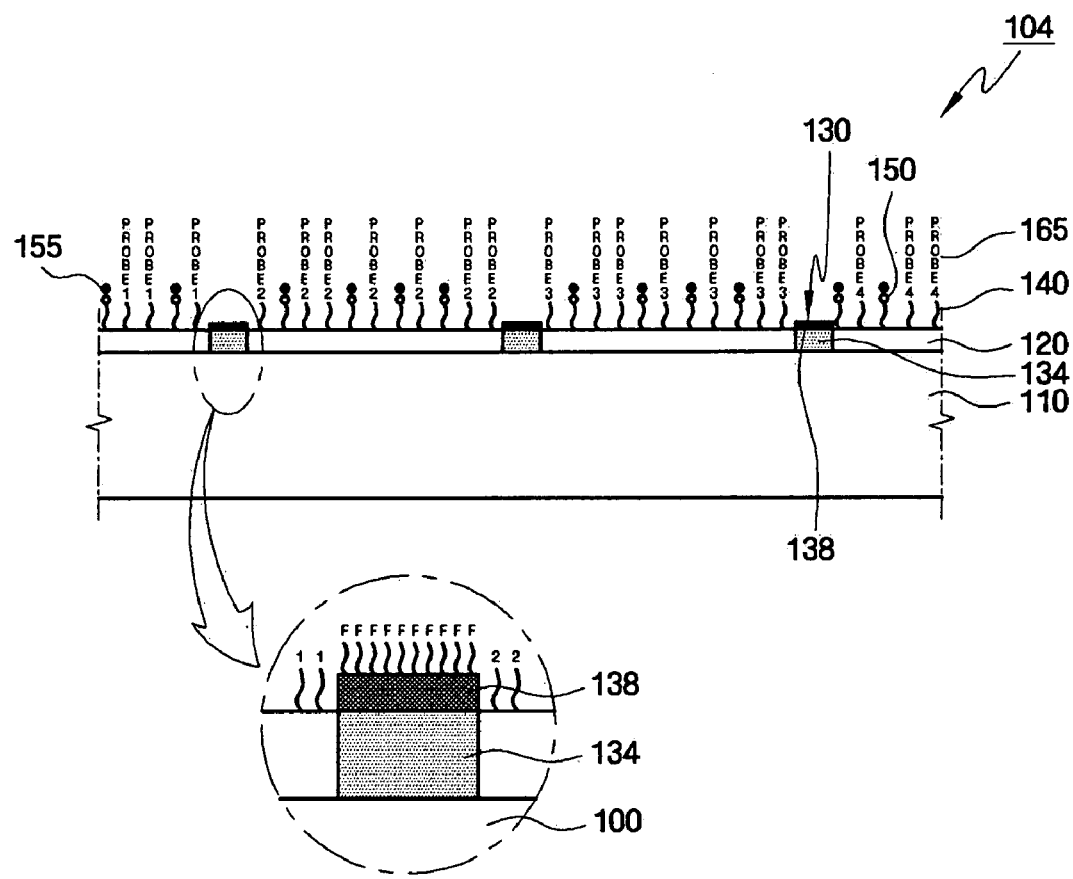
FIG. 21 is a sectional view illustrating a microarray manufactured using methods of manufacturing microarrays according to exemplary embodiments of the present invention.

FIG. 21 is a sectional view illustrating a microarray (104) manufactured using methods of manufacturing microarrays according to some further embodiments of the present invention.

Referring to FIG. 21, the microarray 104 according to the illustrated embodiment of the present invention is structured such that a filler 134 filled in an area defined between probe cell actives 120 and a coupling blocking film 138 formed on the filler 134 are present in a probe cell isolation region 130. In this case, it is not necessarily required that the filler 134 has characteristics preventing the coupling of oligomer probes 165. According to the current embodiment of the present invention, the probe cell isolation region 130 is covered with the filler 134 and the coupling blocking film 138, and thus, functional groups 150 capable of coupling with the oligomer probes 165 or monomers for probe synthesis are absent in the probe cell isolation region 130, thereby more efficiently preventing noise generation.

Figure 22:
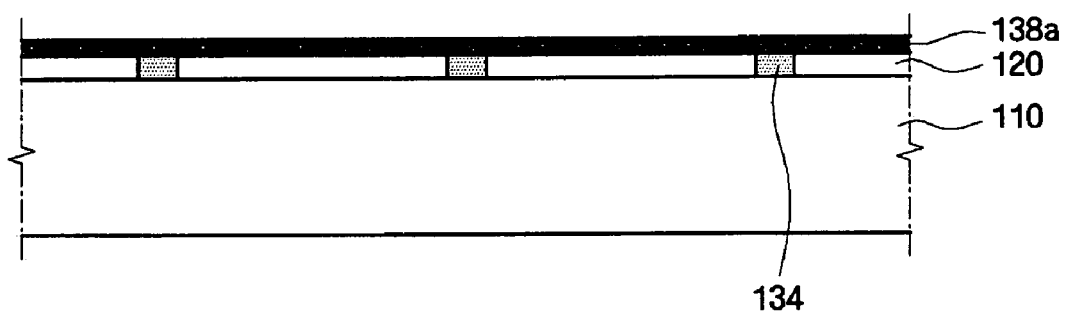
FIG. 22 is a sectional view of an intermediate structure for illustrating a method of manufacturing the microarray of FIG. 21.

FIG. 22 is a sectional view of an intermediate structure for illustrating a method of manufacturing the microarray of FIG. 21.

Referring to FIG. 22, probe cell actives 120 and a filler 134 filled in an area defined between the probe cell actives 120 are formed on a substrate 100 in the same manner as described above with reference to FIG. 20. Then, a coupling blocking film 138a is formed on the entire surface of the substrate 100.

Next, the coupling blocking film pattern 138a formed on the probe cell actives 120 is selectively removed to complete the filler 134 and a coupling blocking film (see 138 of FIG. 21) formed on the filler 134. Alternatively, in a case where the filler 134 is formed as a polysilicone film or an epitaxial film of Si or SiGe and the coupling blocking film pattern 138a is formed as a metal film using cobalt (Co), nickel (Ni), or titanium (Ti), a coupling blocking film (see 138 of FIG. 21) can remain only on the filler 134 by silicidation and then removal of unreacted metal film portions. The subsequent processes are performed in substantially the same manner as described above with reference to FIGS. 5 through 10 or FIGS. 11 and 12.

In methods of manufacturing microarrays according to embodiments of the present invention, acids capable of removing acid-labile protecting groups can be generated with a relatively low exposure amount, thereby reducing exposure time and process duration. Furthermore, with embodiments of the present invention, generated acids can freely move in reaction zones, thereby improving a protecting group removal yield. In addition, with embodiments of the present invention, acid movement from one to another of reaction zones is prevented, and thus the removal of protecting groups in unwanted reaction zones is prevented, thereby reducing a noise.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method of manufacturing a microarray, the method comprising:
    providing a substrate having a surface that is immobilized with a functional group protected with an acid-labile protecting group and capable of coupling with an oligomer probe;
    providing a photoacid generator onto the substrate;
    disposing on the substrate an imprint template comprising a convex region and a plurality of concave regions surrounding the convex region so that the convex region contacts with or is adjacent to an upper surface of the substrate to define a plurality of reaction zones by the upper surface of the substrate and the convex region and the concave regions of the imprint template, and wherein a height of each of the plurality of reaction zones is in a range from about 500 to about 4,000 nanometers (nm);
    exposing one or more of the reaction zones to light so that an acid is generated by the photoacid generator in the one or more exposed reaction zones and a functional group in the one or more exposed reaction zones is deprotected by the acid; and
    providing an oligomer probe onto the substrate so that the oligomer probe couples with the deprotected functional group.

2. The method of claim 1, wherein the imprint template comprises a transmitting area and a light-shielding area, and the exposure of the one or more reaction zones is performed using the imprint template as a photomask.

3. The method of claim 1, wherein a plurality of probe cell actives are formed on the substrate and separated by a probe cell isolation region, the functional group is immobilized on the probe cell actives, the imprint template is disposed on the substrate so that the convex region contacts with or is adjacent to an upper surface of the substrate in the probe cell isolation region, the upper surface of the substrate defining the reaction zones is an upper surface of the probe cell actives, and the reaction zones are defined in a one-to-one correspondence with the probe cell actives.

4. The method of claim 3, wherein the substrate comprises a linker binding with the functional group on the probe cell actives, and the functional group is immobilized on the probe cell actives via the linker.

5. The method of claim 3, wherein a surface of the substrate is directly exposed in the probe cell isolation region.

6. The method of claim 3, wherein the surface of the substrate in the probe cell isolation region comprises one of a surface of an oligomer probe coupling blocking film formed on an upper surface of the substrate, a surface of a filler filled in an area defined between the probe cell actives and having characteristics preventing the coupling of the oligomer probe, or a surface of an oligomer probe coupling blocking film formed on a filler filled in an area defined between the probe cell actives.

7. The method of claim 1, wherein a probe cell active film is formed on the entire surface of the substrate, the probe cell active film is divided into a plurality of activated probe cell regions and an inactivated region surrounding the activated probe cell regions, the functional group is immobilized on both the activated probe cell regions and the inactivated region of the probe cell active film, the imprint template is disposed on the substrate so that the convex region contacts with or is adjacent to an upper surface of the inactivated region of the probe cell active film, the upper surface of the substrate defining the reaction zones is an upper surface of the probe cell actives, and the reaction zones are defined in a one-to-one correspondence with the activated probe cell regions.

8. The method of claim 7, wherein the substrate comprises a linker binding with the functional group on the probe cell actives, and the functional group is immobilized on the probe cell actives via the linker.

9. A method of manufacturing a microarray, the method comprising:
    providing a substrate having a surface that is immobilized with a functional group protected with an acid-labile protecting group and capable of coupling with a nucleotide phosphoramidite monomer;
    providing a photoacid generator onto the substrate;
    disposing on the substrate an imprint template comprising a convex region and a plurality of concave regions surrounding the convex region so that the convex region contacts with or is adjacent to an upper surface of the substrate to define a plurality of reaction zones by the upper surface of the substrate and the convex region and the concave regions of the imprint template, and wherein a height of each of the plurality of reaction zones is in a range from about 500 to about 4,000 nanometers (nm);

exposing one or more of the reaction zones to light so that an acid is generated by the photoacid generator in the one or more exposed reaction zones and a functional group in the one or more exposed reaction zones is deprotected by the acid; and providing a nucleotide phosphoramidite monomer onto the substrate so that the nucleotide phosphoramidite monomer couples with the deprotected functional group.

10. The method of claim 9, wherein the imprint template comprises a transmitting area and a light-shielding area, and the exposure of the one or more reaction zones is performed using the imprint template as a photomask.

11. The method of claim 9, wherein a plurality of probe cell actives are formed on the substrate and separated by a probe cell isolation region, the functional group is immobilized on the probe cell actives, the imprint template is disposed on the substrate so that the convex region contacts with or is adjacent to an upper surface of the substrate in the probe cell isolation region, the upper surface of the substrate defining the reaction zones is an upper surface of the probe cell actives, and the reaction zones are defined in a one-to-one correspondence with the probe cell actives.

12. The method of claim 11, wherein the substrate comprises a linker binding with the functional group on the probe cell actives, and the functional group is immobilized on the probe cell actives via the linker.

13. The method of claim 12, wherein a surface of the substrate is directly exposed in the probe cell isolation region.

14. The method of claim 12, wherein the surface of the substrate in the probe cell isolation region comprises one of a surface of a nucleotide phosphoramidite monomer coupling blocking film formed on an upper surface of the substrate, a surface of a filler filled in an area defined between the probe cell actives and having characteristics preventing the coupling of the nucleotide phosphoramidite monomer, or a surface of a nucleotide phosphoramidite monomer coupling blocking film formed on a filler filled in an area defined between the probe cell actives.

15. The method of claim 9, wherein a probe cell active film is formed on the entire surface of the substrate, the probe cell active film is divided into a plurality of activated probe cell regions and an inactivated region surrounding the activated probe cell regions, the functional group is immobilized on both the activated probe cell regions and the inactivated region of the probe cell active film, the imprint template is disposed on the substrate so that the convex region contacts with or is adjacent to an upper surface of the inactivated region of the probe cell active film, the upper surface of the substrate defining the reaction zones is an upper surface of the probe cell actives, and the reaction zones are defined in a one-to-one correspondence with the activated probe cell regions.

16. The method of claim 15, wherein the substrate comprises a linker binding with the functional group on the probe cell actives, and the functional group is immobilized on the probe cell actives via the linker.

17. The method of claim 8, wherein the provision of the photoacid generator on the substrate, the disposition of the imprint template on the substrate, the selective exposure of the reaction zones, and the provision of the nucleotide phosphoramidite monomer are defined as a cycle, and further comprising repeating the cycle at least once after the coupling of the nucleotide phosphoramidite monomer with the deprotected functional group.

18. The method of claim 17, wherein a nucleobase of a nucleotide phosphoramidite monomer coupling with the deprotected functional group in one cycle is different from that in another cycle.

19. The method of claim 18, wherein the nucleotide phosphoramidite monomer is selected from the group consisting of nucleotide phosphoramidite monomers comprising a nucleobase selected from adenine (A), guanine (G), thymine (T), cytosine (C), and uracil (U).

20. The method of claim 1, wherein the height of each of the plurality of reaction zones is in a range from about 1000 to about 2,000 nm.

* * * * *